United States Patent [19]

Shono

[11] Patent Number: 5,570,153
[45] Date of Patent: Oct. 29, 1996

[54] LENS MOUNTING STRUCTURE

[75] Inventor: Tetsuji Shono, Tokyo, Japan

[73] Assignee: Asahi Kogaku Kogyo Kabushiki Kaisha, Tokyo, Japan

[21] Appl. No.: 506,624

[22] Filed: Jul. 25, 1995

[30] Foreign Application Priority Data

Jul. 28, 1994 [JP] Japan ................................. 6-196011

[51] Int. Cl.$^6$ ............................................... G03B 17/00
[52] U.S. Cl. ......................... 396/531; 352/231; 359/828
[58] Field of Search ........................... 354/286; 352/231; 359/828

[56] References Cited

U.S. PATENT DOCUMENTS

| Re. 32,049 | 12/1985 | Okura et al. | 354/286 |
|---|---|---|---|
| 2,618,201 | 11/1952 | Brohl et al. | 354/286 |
| 2,715,854 | 8/1955 | Simmons et al. | 354/286 |
| 4,017,878 | 4/1977 | Hagiwara | 354/286 |
| 4,199,248 | 4/1980 | Schlapp et al. | 354/286 |
| 4,812,865 | 3/1989 | Ueyama | 354/286 |

OTHER PUBLICATIONS

User's Manual for *Adapter K For 645 Lens* (4 pages) May 28, 1984.

Primary Examiner—Michael L. Gellner
Assistant Examiner—Eddie C. Lee
Attorney, Agent, or Firm—Greenblum & Bernstein P.L.C.

[57] ABSTRACT

A combination of camera bodies and detachable lenses including a lens-side and body-side bayonet mounting structure on two format types of lens and camera bodies to allow the mounting of a larger format lens to a smaller format body, and to preclude the mounting of a smaller format lens to a larger format body. The body-side mounts have mounting gaps of predetermined sizes, and the lens-side mounts have mounting members of predetermined sizes to fit in the mounting gaps. The larger format lens-side mounting member is sized to fit into both smaller and larger format mounting gaps, and the smaller lens-side mounting member is sized to fit into only the smaller format mounting gap. Common reference surfaces are provided to all of the mounts to position the lens in the radial and axial directions.

14 Claims, 4 Drawing Sheets

LENS MOUNTING STRUCTURE

BACKGROUND OF THE INVENTION

The present invention relates to lens mounting structures employed in cameras using detachable lenses, and more specifically, to a combination of camera bodies and lenses having mounting structures for allowing the interchange of lenses between cameras of different formats.

Detachable lens cameras are available in several formats. "Format", in this case, denotes exposable frame size and shape, which is related to the size and shape of the film used in the camera. The exposable frame size determines the minimum imaging circle encompassed by a lens designed for the specific format. The size of the imaging circle by a lens is commonly known as covering power. Cameras of a larger exposable frame size use lenses having greater covering power, while cameras of a smaller exposable frame size use lenses having lesser covering power.

Conventionally, detachable lenses are not readily interchangeable between cameras of differing formats. More specifically, a detachable lens camera cannot use a lens designed for a smaller format than that of the camera because the covering power is insufficient, and the imaging circle does not fill the exposed frame area, resulting in vignetting of the image.

However, a lens designed for a larger format will have sufficient covering power, and therefore may be optically suitable, but a conventional mounting structure is not able to mount a different or larger format lens. In some cases, adapters are available, but adapters are, by nature, bulky and mechanically complicated, and change the optical properties of the imaging system.

SUMMARY OF THE INVENTION

It is therefore an object of the present invention to provide an improved combination of camera bodies and detachable lenses capable of mounting lenses intended for a larger format on a smaller format camera. It is a further object that the improved combination of camera bodies and detachable lenses should prevent the mounting of lenses intended for a smaller format on a larger format camera. It is a still further object that the improved combination of camera bodies and detachable lenses should ensure that all combinations of mountable lenses and cameras are properly positioned for accurate photography by virtue of the mounting engagement.

In order to achieve the objects of the invention, an improved combination of camera bodies and detachable lenses includes a first lens mount, having a larger mating gap formed therein; a first body mount, having a larger mating member formed thereon, the larger mating member being sized to fit into and engage the larger mating gap, so that the first lens-side mount is mountable to the first body mount; a second lens mount, having a smaller mating gap formed therein and a second body mount, having a smaller mating member formed thereon, the smaller mating member being sized to fit into and engage the smaller mating gap, so that the second lens-side mount is mountable to the second body mount. The smaller mating member is small enough to fit into and engage either of the smaller mating gap and the larger mating gap, while the smaller mating gap is too small to accept and engage the larger mating member.

Thus, the first lens-side mount is mountable to either of the first and second body-side mounts, while the second lens-side mount is only mountable to the second body mount. Accordingly, for the combination of camera bodies and detachable lenses of two differing formats, lenses of one of the formats are rendered mountable to either of two body types, while lenses of the remaining format are only mountable to the body type of the matching format.

It is preferred that the first lens-side mount is positionable along a mounting direction by means of the mating of a first air of exterior surfaces provided to the first body-side mount with a first pair of interior surfaces provided to the first lens mount.

In this case, the second lens-side mount is positionable along a mounting direction by means of the mating of a second pair of exterior surfaces provided to the second lens-side mount with a second pair of interior surfaces provided to the second body mount. Preferably, the first pair of interior surfaces provided to the first lens-side mount are arranged similarly to the second pair of interior surfaces provided to the second lens mount, so that the first lens-side mount is positionable along the mounting direction by means of the mating of the first pair of interior surfaces of the first lens-side mount with the second pair of exterior surfaces provided to the second body mount. Thus, as well as controlling which mounts are able to be mated, this construction ensures proper positioning in the mounting direction.

In one particular case, one surface of the first air of interior surfaces of the first lens-side mount is a surface of the larger mating gap, and wherein one surface of the second pair of interior surfaces of the second lens-side mount is a surface of the smaller mating gap. Preferably, one surface of he first pair of exterior surfaces of the first body-side mount is a surface of the larger mating member, and wherein one surface of he second pair of exterior surfaces of the second boy-side mount is a surface of the smaller mating member.

Accordingly, the first lens-side mount and the second lens-side mount are positionable along the mounting direction by means of the engagement of the larger and smaller mating gaps a members. In his case, the mounts are able to be selectively mated and properly positioned along the mounting direction using common portions of the structure to achieve both aims.

According to another aspect of the present invention, an improved combination of camera bodies and detachable lenses includes a first lens mount, having a first pair of interior surfaces formed therein; a first body mount, having a first pair of exterior surfaces formed thereon, wherein the first lens-side mount is positionable along a mounting direction by means of the mating of the first pair of exterior surfaces provided to the first body-side mount with the first pair of interior surfaces provided to the first lens mount; a second lens mount, having a second pair of interior surfaces formed therein; a second body mount, having second pair of exterior surfaces formed thereon, wherein the second lens-side mount is positionable along a mounting direction by means of the mating of the second pair of exterior surfaces provided to the second body-side mount with the second pair of interior surfaces provided to the second lens mount; a first blocking portion provided to the first body mount, between the first pair of exterior surfaces; and a second blocking portion provided to the second lens mount, between the second pair of interior surfaces.

In this case, the second blocking portion is arranged on the second lens-side mount to interfere with the first blocking portion of the first body-side mount when the second lens-side mount is partially inserted in the first body mount. This interference prevents the full insertion of the second lens-side mount into the first body mount, so that the second pair of interior surfaces of the second lens-side mount may not mate with the first pair of exterior surfaces provided to the first body mount. Thus, due to the arrangement of the blocking portions the first lens-side mount is mountable to either of the first and second body-side mounts, while the second lens-side mount is only mountable to the second body mount.

In one preferred embodiment, the first and second lens-side mounts are each provided with a ring portion of the same outer diameter. In this case, the first and second body-side mounts are each provided with a bore portion of the same inner diameter, the ring portions sized to engage the bore portions, and when one of the first and second lens-side mounts is engaged to an accepting one of the first and second body-side mounts, a bore portion and a ring portion engage to locate the lens-side mount in a radial direction relative to the accepting body mount.

Thus, as well as controlling which mounts are able to be mated, this construction ensures proper positioning in a radial direction. In other words, the lens-side mount and body-side mount are positioned relative to each other perpendicular to the mounting direction.

According to a preferred embodiment of the invention, the first lens-side mount and the second lens-side mount are lens-side bayonet mounts, each provided to a camera lens, and the first body-side mount and the second body-side mount are body-side bayonet mounts, each provided to a camera body. The first lens-side mount may then be provided to a larger format camera lens, and the first body-side mount provided to a larger format camera body, while the second lens-side mount is provided to a smaller format camera lens, and the second body-side mount provided to a smaller format camera body.

In this case, the larger format camera lens is mountable to both of the larger and smaller camera bodies, while the smaller format camera lens is only mountable to the smaller format camera body.

According to yet another aspect of the invention, a combination of camera bodies and detachable lenses, includes a smaller format camera body, sized to have a smaller exposable frame size; a smaller format detachable lens, sized to form a smaller size image capable of covering the smaller exposable frame size; a larger format camera body, sized to have a larger exposable frame size than the smaller exposable frame size; a larger format detachable lens, sized to form a larger size image capable of covering both of the larger exposable frame size and the smaller exposable frame size; and a mounting mechanism for selectively mounting the larger and smaller format detachable lenses to the larger and smaller format camera bodies. The mounting mechanism includes a structure for preventing mounting of the smaller format detachable body to the larger format camera body and a mechanism for allowing mounting of the larger format detachable lens to the larger format camera body, mounting of the smaller format detachable lens to the smaller format camera body, and mounting of the larger format detachable lens to the smaller format camera body.

Accordingly, for the combination of camera bodies and detachable lenses of larger and smaller formats, lenses of the larger format are rendered mountable to either of the larger or smaller body format, while lenses of the smaller format are only mountable to the smaller body format. In this manner, a photographer may advantageously use larger format lenses on two different body formats (both of which the larger format lens optically suits), while an attempt at using a smaller format lens inappropriately on a larger format camera body is prohibited.

DESCRIPTION OF THE EMBODIMENTS

Figure 1:
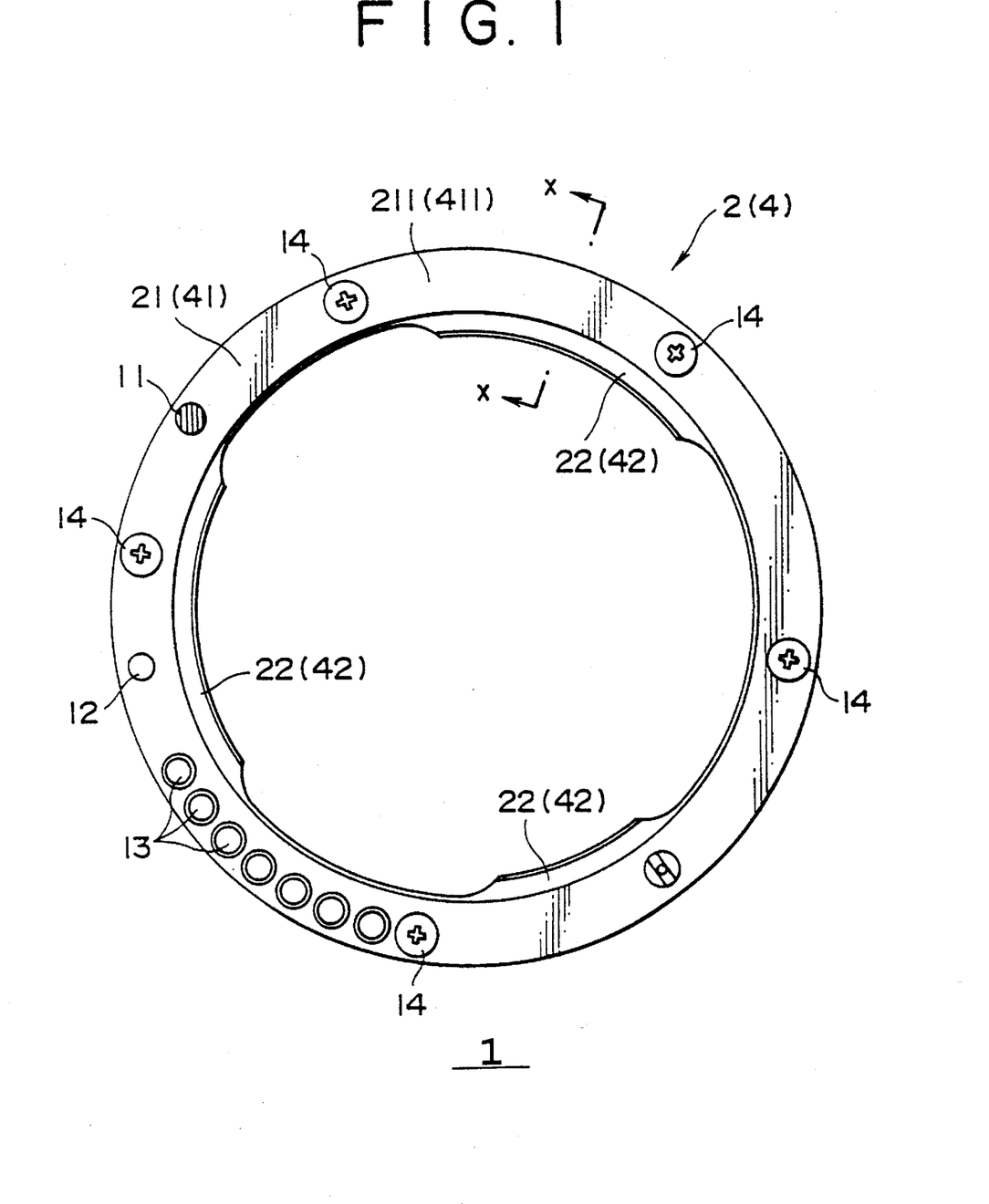
FIG. 1 is a plan view of a body-side bayonet mount applied to a combination of camera bodies and detachable lenses.
Figure 2:
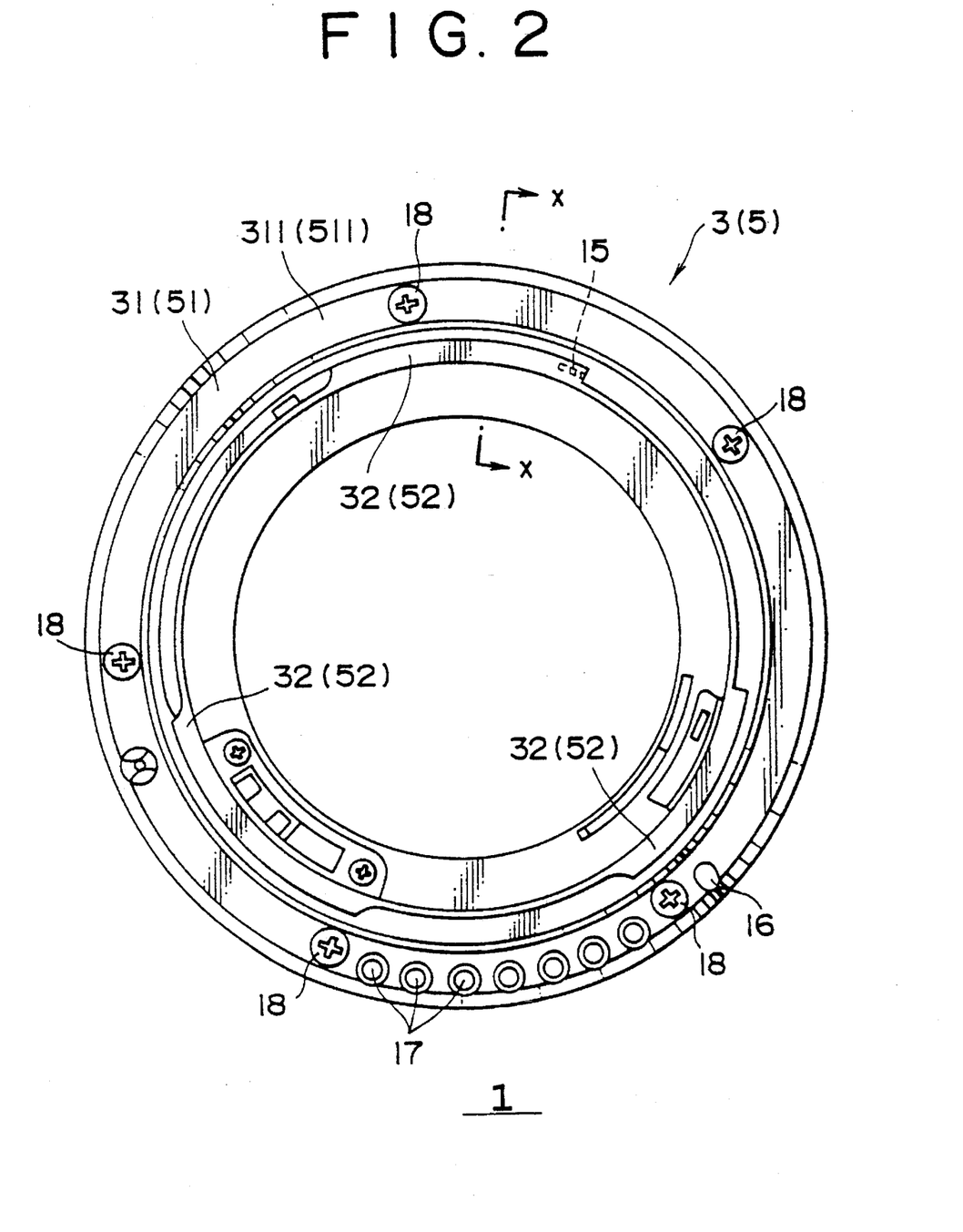
FIG. 2 is a plan view of a lens-side bayonet mount applied to a combination of camera bodies and detachable lenses.

An embodiment of the invention is shown in FIGS. 1 and 2. A mounting structure 1 provided to a combination of camera bodies and detachable lenses is a bayonet-type mounting structure, and is a combination of mount structures for cameras and lenses of differing formats. Herein, "medium " and "small " are used to compare format sizes. As used, "medium " simply denotes a format larger in area than "small". For example, if a small format is standard 135 film (35 mm) format, having an exposable frame size of 24 mm×36 mm, then a medium format can be "Brownie " or 120/220 film, having an exposable frame size of 60 mm×45 mm, 60 mm×70 mm, or other larger frame sizes. Specific format sizes are used as examples only. The invention is equally applicable to allow the mounting of lenses for 60 mm×70 mm format to 60 mm×45 mm format cameras, while prohibiting the mounting 60 mm×45 mm format lenses to the 60 mm×70 mm format cameras. Furthermore, the invention may be used to allow the mounting of 35 mm format lenses to a smaller format camera, while prohibiting the reverse operation. Herein, "MF " is used to denote "medium format", and "SF " to denote "small format", where "medium format " and "smaller format " are as noted above, being simply defined by their relative sizes.

The mounting structure 1, shown in plan view in FIGS. 1 and 2, is a combination of mounting structures including an MF body-side mount 2 provided on an MF camera body (to which a lens may be interchangeably attached), an MF lens-side mount 3, provided on an MF lens, an SF body-side mount 4, provided on an SF camera body, and an SF lens-side mount 5, provided on an SF lens.

The medium format (MF) lens meets the optical requirements of the medium format, having a matching image circle and exposed frame area. Thus, it is at least optically suitable for a small format (SF) camera having a smaller exposed frame area, as the image circle of the MF lens is larger than the exposed frame area of the SF camera. The SF lens meets the optical requirements of the small format, having a matching image circle and exposed frame area.

The MF body-side mount 2 and MF lens-side mount 3 appear in plan view in FIGS. 1 and 2, respectively. The SF body-side mount 4 and the SF lens-side mount 5 appear similarly in plan view to the MF body-side mount 2 and MF lens-side mount 3, respectively, and therefore can be represented by Figs. 1 and 2. Portions of the SF body and lens-side mounts 4 and 5 corresponding to those of the MF body and lens-side mounts 2 and 3 are indicated by bracketed numerals. However, the cross-sectional profiles of the MF mounts 2, 3 and SF mounts 4, 5 are different.

Figure 3:
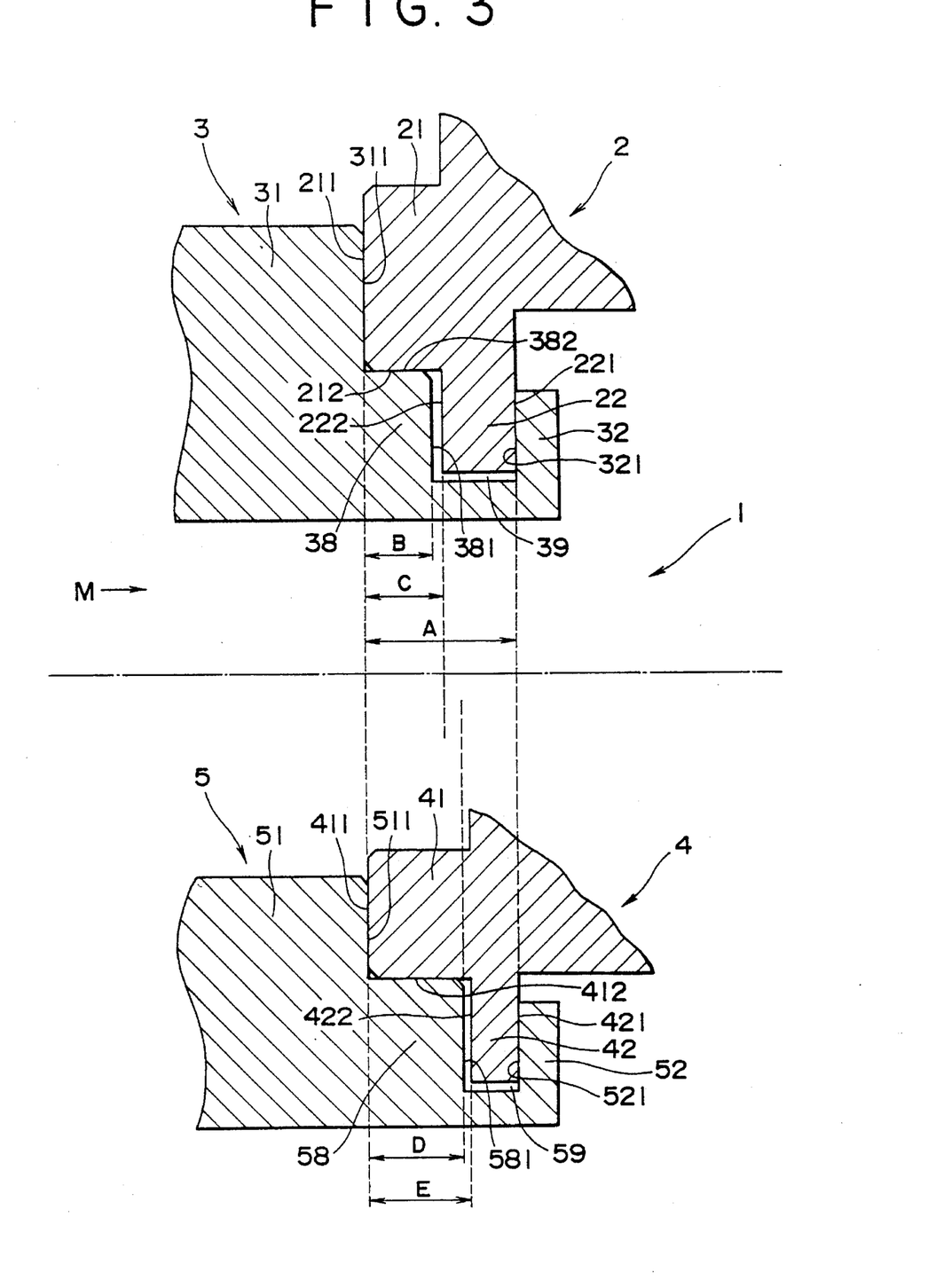
FIG. 3 shows cross sectional, views of engaging conditions of matching format body and lens-side mounts of the combination of camera bodies and detachable lenses, taken along the line X—X of the engaged body and lens-side mounts of FIGS. 1 and 2.
Figure 4:
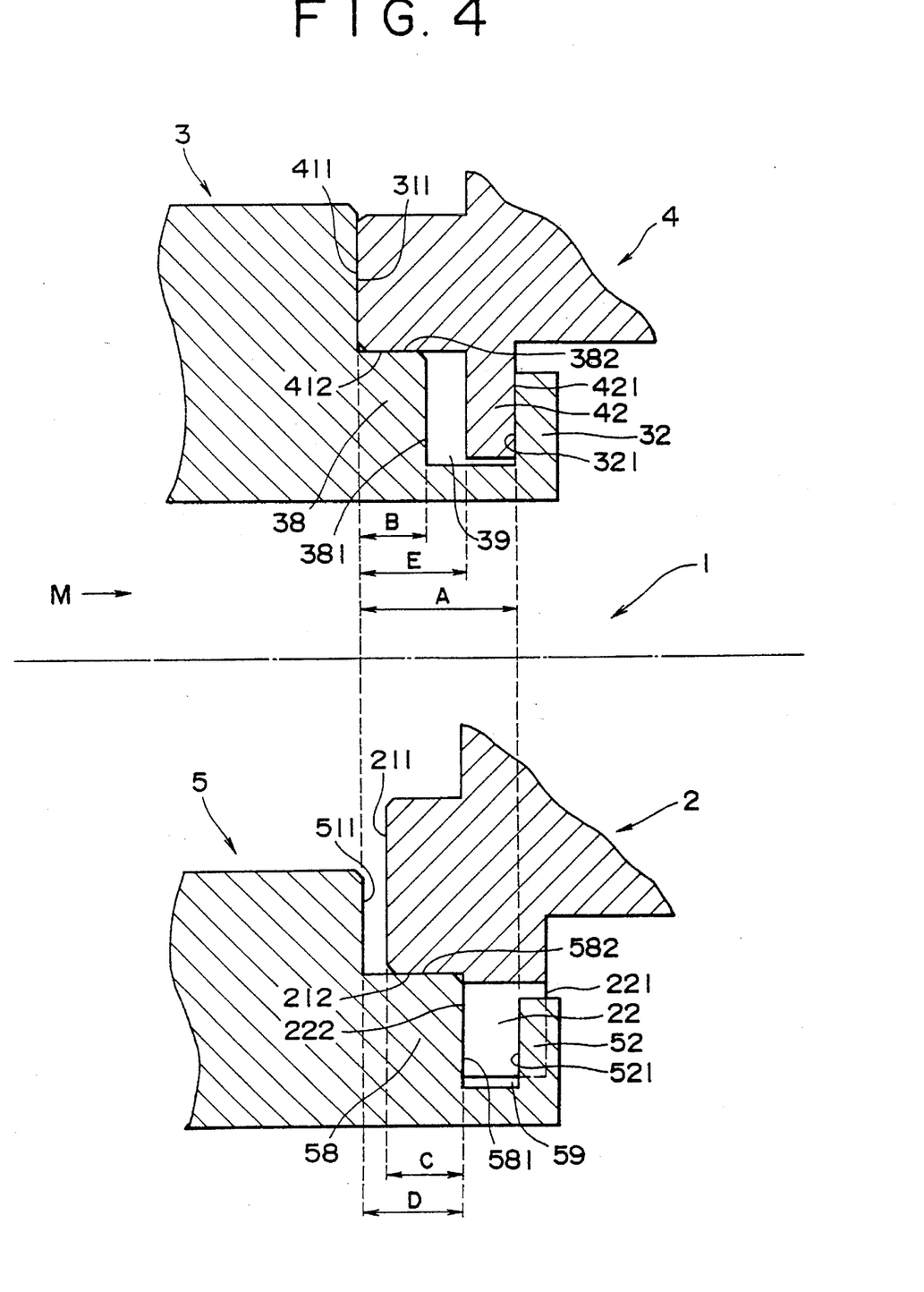
FIG. 4 shows cross sectional views of engaging conditions of differing format body and lens-side mounts of the combination of camera bodies and detachable lenses, taken along the line X—X of the engaged body and lens-side mounts of FIGS. 1 and 2.

The upper portion of FIG. 3 is a sectional view showing the mounting of the MF lens-side mount 3 to the MF body-side mount 2, while the lower portion of FIG. 3 is a sectional view showing the mounting of the SF lens-side mount 5 to the SF body-side mount 4. The upper portion of FIG. 4 is a sectional view showing the mounting of the MF lens-side mount 3 to the SF body-side mount 4, while the lower portion of FIG. 4 is a sectional view showing the prevention of the mounting of the SF lens-side mount 5 to the EF body-side mount 2. The sections of FIG. 3 and 4 are taken along the lines X—X in both of FIGS. 1 and 2.

As shown in FIG. 1 and the upper portion of FIG. 3, the MF body-side mount 2 of the mounting structure 1 comprises an MF body-side mount frame member 21 having substantially a ring shape, surrounding an opening in the MF camera body. Three MF body-side mount flanges 22 are substantially equiangularly formed about the inner circumferential surface of the MF body-side mount frame member 21. Each of the MF body-side mount flanges 22 constitutes a mating member. The body-side mount 2 is secured to a camera body (not shown) by screws 14. A retractable spring-biased lock pin 12, resiliently protruding from the MP body-side mount frame member 21, and retractable by means of an unlocking button (not shown), is disposed on the MF body-side mount frame member 21. A red mark 11 is provided on the MF body-side mount frame member 21 to aid alignment of the MF body and lens-side mounts 2 and 3. Furthermore, a set of resiliently mounted electrical contacts 13 are provided in the MF body-side mount frame member 21 for exchanging data and control signals between the lens and camera body.

As shown in FIG. 3, the MF body-side mount frame member 21 con, rises an MF body-side mount reference bore 212 on the inner diameter thereof, and an MF body-side mount reference surface 211 perpendicular to the mounting direction M. The MF body-side mount flanges 22 comprise MF body-side mount flange outer surfaces 222, deeper inside the camera body than the MF body-side mount reference surface 211 (the distance therebetween designated as C). Inner surfaces of the MF body-side mount flanges 22 act as F body-side mount locking surfaces 221, and are engageable with matching surfaces (described later) of the MF lens-side mount 3 when the MF lens is mounted. The distance A between the MF body-side mount reference surface 211 and the MF body-side mount locking surface 221 is predetermined, and the surfaces 211 and 221 are parallel to each other, perpendicular to the mounting direction M, and face away from each other (forming a pair of exterior surfaces). The width of the MF body-side mount flange is therefore A-C.

As shown in FIG. 2, the MF lens-side mount 3 of the mounting structure 1 comprises an MF lens-side mount frame member 31 having substantially a ring shape, and surrounding the camera side of the MF lens and the optical path thereof. Three MF lens-side mount flanges 32 are substantially equiangularly formed about the outer circumferential surface of the MF lens-side mount frame member 31. The lens-side mount 3 is secured to a lens (not shown) by screws 18. A locking groove 16 is provided in the MF lens-side mount frame member 31 to mate with the aforementioned locking pin 12 in the MF body-side mount frame member 21. A rod mark 15 is provided on the MF lens-side mount 3 to aid alignment of the MF body and lens-side mounts 2 and 3. Furthermore, a set of resiliently mounted electrical contacts 17 are provided in the MF lens-side mount frame member 31 for exchanging data and control signals between the lens and camera body.

The MF lens-side mount frame member 31 comprises an MF lens-side mount reference surface 311, which abuts the MF body-side mount reference surface. 211 when the MF lens is attached to the MF camera body (e.g., when the MF lens-side mount 3 is attached to the M body-side mount 2). An MF lens-side mount stepped portion 38 (FIG. 3, upper portion) steps up (by a distance B) from the inner circumference of the MF lens-side mount reference surface 311 of the MF lens-side mount frame member 31, and under the MF lens-side mount flange 32. The MF lens-side mount stepped portion 38 comprises MF lens-side mount ring surface 382 on the outer diameter thereof. An MF lens-side mount stepped portion inner surface 381 on the MF lens-side mount stepped portion, perpendicular to the mounting direction M, opposes an MF lens-side mount locking surface 321 formed on an inner side of the MF lens-side mount flange 32, forming an MF lens-side mount mating gap 39 (of width A-B) therebetween. The MF lens-side mount reference surface 311 and MF lens-side mount lock surface 321 are separated by the predetermined distance A (in actuality, slightly larger, to allow a slip fit), parallel to each other, perpendicular to the mounting direction M, and face towards each other (forming a pair of interior surfaces). Thus, when combined, the MF lens-Side mount mating gap 39 (width A-B) and stepped portion 38 (width B) are of a width corresponding to A, that is corresponding to the distance between the MF body-side mount reference surface 211 and the MF body-side mount locking surface 221.

The MF body-side mount flanges 22 can enter the MF lens-side mount mating gap 39 (see FIG. 3, upper portion), as the width B of the MF lens-side mount stepped portion 38 is made the same or slightly narrower than the distance C from the MF body-side mount reference surface 211 to the MF body-side mount flange outer surface 222, making the width of the MF lens-side mount mating gap 39 (width A-B) wider than the width (A-C) of the MF body-side mount flanges 42.

The SF body-side mount 4 and SF lens-side mount 5, appearing in the lower portion of FIG. 3, are arranged similarly to the MF body-side mount 2 and MF lens-side mount 3, respectively, but with important dimensional differences.

FIG. 1 is also representative of the SF body-side mount 4. Thus, the SF body-side mount 4 includes an SF body-side mount frame member 41, an SF body-side mount reference surface 411, an SF body-side mount reference bore 412, SF body-side mount flanges 42, SF body-side mount flange outer surfaces 422, and SF body-side mount locking surfaces 421, each part corresponding in orientation to those similarly identified and described previously for the MF body-side mount 2. Each of the SF body-side mount flanges 42 constitutes a mating member. However, the distances between surfaces are chosen to allow the mounting of the both the SF lens-side mount 5 and the MF lens-side mount 3. Specifically, the distance between the SF body-side mount reference surface 411 and SF body-side mount locking surfaces 421 remains A, as with the MF body-side mount 2. Furthermore, a distance E from the SF body-side mount reference surface 411 to the SF body-side mount flange outer surface 422 is wider than the distance C from the MF body-side mount reference surface 211 to the MF body-side mount flange outer surface 222, making the width of the SF body-side mount flanges 42 (width A-E) narrower than that of the MF body-side mount flanges 22 (width A-C). The distance E from the SF body-side mount reference surface 411 to the SF body-side mount flange outer surface 422 is also wider than the step width B of the MF lens-side mount stepped portion 38, making the width of the MF lens-side mount mating gap 39 (width A-B) wider than that of the SF body-side mount flanges 42 (width A-E). Therefore, the SF body-side mount flanges 42 can enter the MF lens-side mount mating gap 39 ( see FIG. 4, upper portion).

Furthermore, FIGS. 2 and 3 are also representative of the SF lens-side mount 5. The SF lens-side mount 5 includes an SF lens-side mount frame member 51, three SF lens-side mount flanges 52, an SF lens-side mount reference surface 511, an SF lens-side mount stepped portion 58, an SF lens-side mount ring surface 582, an SF lens-side mount stepped portion inner surface 581, an SF lens-side mount locking surface 521, and an SF lens-side mount mating gap 59. However, the distances therebetween are chosen to allow mounting to only the SF body-side mount 4 and not the MF body-side mount 2. Specifically, the distance between the SF lens-side mount reference surface 511 and SF lens-side mount locking surfaces 521 remains A ( in actuality, slightly larger, to allow a slip fit), as with the SF lens-side mount 3.

Additionally, a step width D (from the SF lens-side mount reference surface 511) of the SF lens-side mount stepped portion 58 is wider than the step width B of the MF lens-side mount stepped portion 38, making the width of the SF lens-side mount mating gap 59 (width A-D) narrower than that of the MF lens-side mount mating gap 39 (width A-B). The step width D of the SF lens-side mount stepped portion 58 is also wider than the distance C from the MF body-side mount reference surface 211 to the MF body-side mount flange outer surface 222, making the width of the SF lens-side mount mating gap 59 (width A-D) narrower than that of the MF body-side mount flanges 22 (width A-C). Therefore, the MF body-side mount flanges 22 cannot enter the SF lens-side mount mating gap 59 (see FIG. 4, lower portion), and the SF lens-side mount 5 may not be mated to the MF body-side mount 2.

However, the SF body-side mount flanges 42 can enter the SF lens-side mount mating gap 59 (see FIG. 3, lower portion), as the width D of he SF lens-side mount stepped portion 58 is made the same or slightly narrower than the distance E from the SF body-side mount reference surface 411 to the SF body-side mount flange outer surface 422, making the making the width of the SF lens-side mount mating gap 59 (width A-D) wider than the width (A-E) of the SF body-side mount flanges 42.

The procedure for mounting a lens to a body is described with reference to FIGS. 1, 2, and the upper portion of FIG. 3, where a medium format lens having an MF lens-side mount 3 is mounted to a medium format camera body having an MF body-side mount 2. The procedure is analogous, when mounting either of the lenses to a compatible body that is; when mounting the SF lens-side mount 5 to the SF body-side mount 4, and when mounting the MF lens-side mount 3 to the SF body-side mount 4.

In order to mount the lens, the red marks 15 and 11 on the MF lens-side mount 3 and MF body-side mount 2, respectively, are aligned. In =his orientation, the flanges 32 of the MF lens-side mount 3 fit into the spaces between the flanges 22 of the MF body-side mount 2. As the MF lens-side mount 3 is placed into the MF body-side mount 2, the outer diameter MF lens-side mount ring surface 382 slides into the MF body-side mount reference bore 212, regulating the position of the MF body-side mount 3 in a radial direction with respect to the mounting direction. The MF lens-side mount 3 is slid into the MF body-side mount in this manner, until the MF lens-side mount reference surface 311 abuts the MF body-side mount reference surface 211, referencing the position of the MF body-side mount 3. The MF lens-side mount 3 is then rotated in a clockwise direction (from the perspective of FIG. 1), while the MF lens-side mount reference surface 311 is held against the MF body-side mount reference surface 211. At this time, the resiliently protruding lock pin 12 is depressed by the MF lens-side mount reference surface 311. In this case, the step width B of the MF lens-side mount stepped portion 38 is narrower than the distance C from the MF body-side mount reference surface 211 to the MF body-side mount flange outer surface 222 (B<C). Thus, when the MF lens-side mount 3 is rotated, the MF body-side mount flanges 22 are able to enter and engage the MF lens-side mount mating gap 39. Furthermore, the distance between the MF body-side mount reference surface 211 and the MF body-side mount locking surface 221 (exterior surfaces) and between the MF lens-side mount reference surface 311 and MF lens-side mount lock surface 321 (interior surfaces) is substantially the same, A, allowing a slip fit. Thus, when the MF lens-side mount 3 is rotated, as the MP body-side mount reference surface 211 slides along and is referenced against the MF lens-side mount reference surface 311, and the MF body-side mount locking surface 221 slides along the MF lens-side mount lock surface 321, the MF lens-side mount 3 is positioned and regulated, with reference to the MF body-side mount 2, in the mounting direction.

As the MF lens-side mount 3 is further rotated, the locking groove 16 approaches the locking pin 12, and the spring-biased locking pin 12 snaps into the locking groove 16, appropriately angularly locating and the lens in place. At this point, the resiliently mounted electrical contacts 13 and 17 align, and are able to exchange data and control signals between the camera and lens. In order to release the lens, the unlocking button (not shown) is depressed, disengaging the locking pin 12 from the locking groove, whereupon the MF lens-side mount 3 may be reversely rotated and withdrawn.

Mounting of the MF lens-side mount 3 to the SF body-side mount 4, and of the SF lens-side mount 5 to the SF body-side mount 4, is similarly accomplished. In the case of the MF lens-side mount 3 and SF body-side mount 4, the step width B of the SF lens-side mount stepped portion 38 is narrower than the distance E from the SF body-side mount reference surface 411 to the SF body-side mount flange outer surface 422 (B<E). Thus, when the SF lens-side mount 3 is rotated, the MF body-side mount flanges 22 are able to enter and engage the SF 1 lens-side mount mating gap 49. Furthermore, the distance between the SF body-side mount reference surface 411 and the SF body-side mount locking surface 421 (exterior surfaces) and between the MF lens-side mount reference surface 311 and MF lens-side mount lock surface 321 (interior surfaces) is substantially the same, A, allowing a slip fit.

In the case of the SF lens-side mount 5 and SF body-side mount 4, the step width D of the SF lens-side mount stepped portion 58 is narrower than the distance E from the SF body-side mount reference surface 411 to the SF body-side mount flange outer surface 422 (D<E). Thus, when the SF lens-side mount 3 is rotated, the SF body-side mount flanges 52 are able to enter and engage the SF lens-side mount mating gap 49. Furthermore, the distance between the SF body-side mount reference surface 411 and the SF body-side mount locking surface 421 (exterior surfaces) and between the SF lens-side mount reference surface 511 an SF lens-side mount lock surface 521 (interior surfaces) is substantially the same, A, allowing a slip fit.

However, it is impossible to mount the SF lens-side mount 5 to the MF body-side mount 2. As shown in the lower portion of FIG. 4, the step width D of the SF lens-side mount stepped portion 58 is greater than the distance C from the MF body-side mount reference surface 211 to the MF body-side mount flange outer surface 222 (D>C). Thus, when one attempts to rotate the SF lens-side mount 3, the MF body-side mount flanges 22 are unable to enter or engage the SF lens-side mount mating gap 49. In fact, the reference surfaces 511 and 211 are unable no meet, as contact of the MF body-side mount flange outer surface 222 to the SF lens-side mount stepped portion inner surface 581 also keeps the SF lens-side mount 5 from properly engaging the MF body-side mount 2.

An alternative way of expressing this "preventing" function of the combination of camera bodies and detachable lenses is that the MF body-side mount flange outer surface 222 and SF lens-side mount stepped portion inner surface 581 each constitute a blocking portion, ad the interference between them prevents the alignment or engagement (mating) of the SF lens-side mount reference surface 511 to the MF body-side mount reference surface 211. Consequently, the alignment or engagement (mating) SF lens-side mount lock surface 521 to the MF body-side mount locking surface 221 is prevented, thereby prohibiting the mounting of the SF lens-side mount 5 to the SF body-side mount 2. The blocking portions are, in this case, the full width of the part to which they are provided, but smaller protrusions serving the same function would not depart from the essential spirit and scope of the invention.

Thus, using the embodiment of a combination of camera bodies and detachable lenses according to the invention, a larger format body-side mount is unable to engage a smaller format lens mount, but is able to engage the larger format lens mount. At the same time, using the embodiment of a combination of camera bodies and detachable lenses according to the invention, a smaller format body-side mount is able to mount both larger and smaller format lens-side mounts. Accordingly, a photographer is able to carry a larger format lens and use it with either of two format size bodies, as the larger format lens is generally optically suitable for both formats. Furthermore, since the smaller format lenses are not optically suitable for the larger format, they should be prevented from being mounted on the larger format body. The combination of camera bodies and detachable lenses achieves this object.

The present disclosure relates to subject matter contained in Japanese Patent Application No. HEI 06-196011, filed on Jul. 28, 1994, which is expressly incorporated herein by reference in its entirety.

What is claimed is:

1. A combination of camera bodies and detachable lenses, comprising:

a first lens-side mount, having a first mating gap formed therein;

a first body-side mount, having a first mating member formed thereon, said first mating member being sized to fit into and engage said first mating gap, so that said first lens-side mount is mountable to said first body-side mount;

a second lens-side mount, having a second mating gap formed therein, said second mating gap being smaller than said first mating gap;

a second body-side mount, having a second mating member formed thereon, said second mating member being sized to fit into and engages said second mating gap, so that said second lens-side mount is mountable to said second body-side mount, said second mating member being smaller than said first mating member, wherein said second mating member is sized to fit into and engage either of said second mating gap and said first mating gap, and said second mating gap is sized to preclude fitting into and engagement with said first mating member, so that said first lens-side mount is mountable to either of said first and second body-side mounts, while said second lens-side mount is mountable only to said second body-side mount.

2. The combination of camera bodies and detachable lenses according to claim 1, wherein said first lens-side mount is positionable along a mounting direction by the mating of a first pair of exterior surfaces provided to said first body-side mount with a first pair of interior surfaces provided to said first lens-side mount, and wherein said second lens-side mount is positionable along a mounting direction by mating of a second pair of exterior surfaces provided to said second lens-side mount with a second pair of interior surfaces provided to said second body-side mount.

3. The combination of camera bodies and detachable lenses according to claim 2, wherein a distance between said first pair of interior surfaces provided on said first lens-side mount is substantially the same as a distance between said second pair of interior surfaces provided on said second lens-side mount, so that said first lens-side mount is positionable along said mounting direction by mating of said first pair of interior surfaces of said first lens-side mount with said second pair of exterior surfaces provided to said second body-side mount.

4. The combination of camera bodies and detachable lenses according to claim 3, wherein one surface of said first pair of interior surfaces of said first lens-side mount is a surface of said first mating gap, and wherein one surface of said second pair of interior surfaces of said second lens-side mount is a surface of said second mating gap.

5. The combination of camera bodies and detachable lenses according to claim 4, wherein one surface of said first pair of exterior surfaces of said first body-side mount is a surface of said first mating member, and wherein one surface of said second pair of exterior surfaces of said second body-side mount is a surface of said second mating member, whereby said first lens-side mount and said second lens-side mount are positionable along said mounting direction by said engagement of said first and second mating gaps and members.

6. The combination of camera bodies and detachable lenses according to claim 1, wherein each of said first and second lens-side mounts are provided with a ring portion of equal outer diameter, and wherein each of said first and second body-side mounts are provided with a bore portion of equal inner diameter, said ring portions being sized to engage said bore portions, and wherein when one of said first and second lens-side mounts is engaged to an accepting one of said first and second body-side mounts, a bore portion and a ring portion engage to position said one of said first and second lens-side mounts in a radial direction relative to said accepting one of said first and second body-side mounts.

7. The combination of camera bodies and detachable lenses according to claim 1, wherein said first lens-side mount and said second lens-side mount are lens-side bayonet mounts, each provided to a detachable lens, and said first body-side mount and said second body-side mount are body-side bayonet mounts, each provided to a camera body.

8. The combination of camera bodies and detachable lenses according to claim 7, wherein said first lens-side mount is provided on a first detachable lens, and said first body-side mount is provided on a first camera body, and wherein said second lens-side mount is provided on a second detachable lens, and said second body-side mount is provided on a second camera body, said second detachable lens sized to form a smaller exposable frame size than said first detachable lens, and said second camera body sized to form a smaller exposable frame size than said first camera body, whereby said first detachable lens is mountable to both of said first and second camera bodies, while said second detachable lens is mountable only to said second camera body.

9. The combination of camera bodies and detachable lenses according to claim 8, wherein said first detachable lens and said first camera body are sized to form a 60 mm×45 mm image on "120" type film, and said second detachable lens and said second camera body are sized to form a 24 mm×36 mm image on "135" type film.

10. The combination of camera bodies and detachable lenses according to claim 8, wherein said first detachable lens and said first camera body are sized to form a 60 mm×70 mm image on "120" type film, and said second detachable lens and said second camera body are sized to form a 60 mm×45 mm image on "120" type film.

11. A combination of camera bodies and detachable lenses, comprising:

a first lens-side mount, having a first pair of interior surfaces formed thereon;

a first body-side mount, having a first pair of exterior surfaces formed thereon, wherein said first lens-side mount is positionable along a mounting direction by mating of said first pair of exterior surfaces provided to said first body-side mount with said first pair of interior surfaces provided to said first lens-side mount;

a second lens-side mount, having a second pair of interior surfaces formed thereon:

a second body-side mount, having a second pair of exterior surfaces formed thereon, wherein said second lens-side mount is positionable along a mounting direction by mating of said second pair of exterior surfaces provided to said second body-side mount with said second pair of interior surfaces provided to said second lens-side mount;

a first blocking portion provided on said first body-side mount, between said first pair of exterior surfaces;

a second blocking portion provided on said second lens-side mount, between said second pair of interior surfaces;

wherein said second blocking portion is arranged on said second lens-side mount to interfere with said first blocking portion of said first body-side mount when said second lens-side mount is partially inserted in said first body-side mount, said interferences preventing a full insertion of said second lens-side mount into said first body-side mount, so that said second pair of interior surfaces of said second lens-side mount may not mate with said first pair of exterior surfaces provided to said first body-side mount;

wherein said first lens-side mount and said second lens-side mount are lens-side bayonet mounts, each provided to a detachable lens, and said first body-side mount and said second body-side mount are body-side bayonet mounts, each provided to a camera body;

wherein said first lens-side mount is provided on a first detachable lens, and said first body-side mount is provided on a first camera body, and wherein said second lens side-mount is provided on a second detachable lens, and said second body-side mount is provided on a second camera body, said second detachable lens sized to form a smaller exposable frame size than said first detachable lens, and said second camera body sized to form a smaller exposable frame size than said first camera body, whereby said first detachable lens is mountable to both of said first and second camera bodies, while said second detachable lens is mountable to said second camera body but is not mountable to said first camera body.

12. The combination of camera bodies and detachable lenses according to claim 11, wherein each of said first and second lens-side mounts are provided with a ring portion of equal outer diameter, and wherein each of said first and second body-side mounts are provided with a bore portion of equal inner diameter, said ring portions sized to engage said bore portions, and wherein when one of said first and second lens-side mounts is engaged to an accepting one of said first and second body-side mounts, a bore portion and a ring portion engage to position said one of said first and second lens-side mounts in a radial direction relative to said accepting one of said first and second body-side mounts.

13. The combination of camera bodies and detachable lenses according to claim 11, wherein said first detachable lens and said first camera body are sized to form at least a 60 mm ×45 mm image on "120" type film, and said second detachable lens and said second camera body are sized to form a 24 mm×36 mm image on "135" type film.

14. The combination of camera bodies and detachable lenses according to claim 11, wherein said first detachable lens and said first camera body are sized to form a 60 mm×70 mm image on "120" type film, and said second detachable lens and said second camera body are sized to form a 60 mm×45 mm image on "120" type film.

* * * * *

UNITED STATES PATENT AND TRADEMARK OFFICE
CERTIFICATE OF CORRECTION

PATENT NO. : 5,570,153
DATED : October 29, 1996
INVENTOR(S) : Tetsuji SHONO

It is certified that error appears in the above-indentified patent and that said Letters Patent is hereby corrected as shown below:

At column 10, line 17 (claim 2, line 4), delete "the".

Signed and Sealed this

Twenty-fifth Day of March, 1997

Attest:

BRUCE LEHMAN

*Attesting Officer*   Commissioner of Patents and Trademarks